United States Patent
Schaus et al.

(10) Patent No.: US 9,617,392 B2
(45) Date of Patent: Apr. 11, 2017

(54) COMPOSITIONS AND METHODS FOR SELF-ASSEMBLY OF POLYMERS WITH COMPLEMENTARY MACROSCOPIC AND MICROSCOPIC SCALE UNITS

(75) Inventors: Thomas E. Schaus, Brookline, MA (US); Peng Yin, Brookline, MA (US); Wei Sun, Boston, MA (US); David Yu Zhang, Houston, TX (US)

(73) Assignee: President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 14/131,701

(22) PCT Filed: Jul. 10, 2012

(86) PCT No.: PCT/US2012/046036
§ 371 (c)(1),
(2), (4) Date: Mar. 26, 2014

(87) PCT Pub. No.: WO2013/009736
PCT Pub. Date: Jan. 17, 2013

(65) Prior Publication Data
US 2014/0303320 A1    Oct. 9, 2014

Related U.S. Application Data

(60) Provisional application No. 61/506,143, filed on Jul. 10, 2011.

(51) Int. Cl.
*H01F 1/42* (2006.01)
*C08G 83/00* (2006.01)
(Continued)

(52) U.S. Cl.
CPC ......... *C08G 83/008* (2013.01); *C08G 85/002* (2013.01); *C08G 85/004* (2013.01);
(Continued)

(58) Field of Classification Search
CPC ..... H01F 1/01; H01F 1/40; H01F 1/42; C08K 2201/01; C08K 2201/002; C08G 83/008;
(Continued)

(56) References Cited

U.S. PATENT DOCUMENTS 4,284,750 A * 8/1981 Amirsakis ............ C08G 18/423
    360/134
5,355,577 A   10/1994 Cohn
(Continued)

FOREIGN PATENT DOCUMENTS

WO    WO 2007/047572 A2    4/2007
WO    WO 2009/019008 A1    2/2009
(Continued)

OTHER PUBLICATIONS

Katsoyannis et al., "Studies on the Synthesis of Insulin from Natural and Synthetic A and B Chains. III. Synthetic Insulins" 6(9) Biochemistry 2656-2668 (1967).*
(Continued)

*Primary Examiner* — Margaret Moore
(74) *Attorney, Agent, or Firm* — Wolf, Greenfield & Sacks, P.C.

(57) ABSTRACT

The invention provides compositions and methods relating to self-assembly of structures of various size and shape complexity. The composition include synthetic single-stranded polymers having a backbone and pre-determined linear arrangement of monomers.

20 Claims, 8 Drawing Sheets

(51) Int. Cl.
*C08G 85/00* (2006.01)
*H01F 1/01* (2006.01)
*H01F 1/40* (2006.01)

(52) U.S. Cl.
CPC .... *C08K 2201/002* (2013.01); *C08K 2201/01* (2013.01); *H01F 1/01* (2013.01); *H01F 1/40* (2013.01); *H01F 1/42* (2013.01)

(58) Field of Classification Search
CPC .... C08G 83/001; C08G 83/00; C08G 85/002; C08G 85/004
See application file for complete search history.

(56) References Cited

U.S. PATENT DOCUMENTS

| | | | | |
|---|---|---|---|---|
| 5,650,529 | A * | 7/1997 | O'Lenick, Jr. | 556/418 |
| 5,823,938 | A * | 10/1998 | Hernandez | A61F 9/00718 600/15 |
| 6,507,989 | B1 | 1/2003 | Bowden et al. | |
| 7,007,370 | B2 | 3/2006 | Gracias et al. | |
| 7,385,006 | B2 * | 6/2008 | Ueda | C08F 220/12 525/100 |
| 7,601,781 | B2 * | 10/2009 | Fujita | C08F 8/42 522/148 |
| 8,143,571 | B1 * | 3/2012 | Dyer et al. | 250/281 |
| 2005/0208006 | A1 * | 9/2005 | Mathonneau | A61K 8/0245 424/70.1 |
| 2010/0203532 | A1 | 8/2010 | Makrigiorgos | |
| 2012/0052286 | A1 * | 3/2012 | Norwood | B82Y 25/00 428/323 |
| 2013/0271250 | A1 * | 10/2013 | Weissleder | H01F 1/009 335/306 |
| 2013/0281623 | A1 * | 10/2013 | Bajjuri | C08K 3/22 525/54.1 |
| 2014/0205851 | A1 * | 7/2014 | Mahajan | B32B 7/12 428/554 |
| 2015/0315868 | A1 * | 11/2015 | Fripp | E21B 33/10 166/387 |

FOREIGN PATENT DOCUMENTS

| | | |
|---|---|---|
| WO | WO 2010/065626 A1 | 6/2010 |
| WO | WO 2011/112534 A1 | 9/2011 |

OTHER PUBLICATIONS

Aldaye et al., Assembling materials with DNA as the guide. Science. Sep. 26, 2008;321(5897):1795-9. doi: 10.1126/science.1154533.

Andersen et al., Self-assembly of a nanoscale DNA box with a controllable lid. Nature. May 7, 2009;459(7243):73-6. doi:10.1038/nature07971.

Cho et al., Nanoscale Origami for 3D Optics. Small. Jul. 18, 2011;7(14):1943-8.

Davey et al., Stabilizing a solid—solid interface with a molecular-scale adhesive. Nature. Dec. 16, 1999;402:797-99.

Douglas et al., Self-assembly of DNA into nanoscale three-dimensional shapes. Nature. May 21, 2009;459(7245):414-8. Available in PMC Nov. 21, 2009.

Du et al., Directed assembly of cell-laden microgels for fabrication of 3D tissue constructs. Proc Natl Acad Sci U S A. Jul. 15, 2008;105(28):9522-7. doi: 10.1073/pnas.0801866105. Epub Jul. 3, 2008.

Hariadi et al., Elongational-flow-induced scission of DNA nanotubes in laminar flow. Phys Rev E Stat Nonlin Soft Matter Phys. Oct. 2010;82(4 Pt 2):046307. Epub Oct. 19, 2010.

Kuo et al., DNA-like interactions enhance the miscibility of supramolecular polymer blends. Polumer. Jan. 2, 2009;5o(1):177-88.

Milbury et al., Multiplex amplification coupled with COLD-PCR and high resolution melting enables identification of low-abundance mutations in cancer samples with low DNA content. J Mol Diagn. Mar. 2011;13(2):220-32. doi: 10.1016/j.jmoldx.2010.10.008.

Olson et al., Chemical mimicry of viral capsid self-assembly. Proc Natl Acad Sci U S A. Dec. 26, 2007;104(52):20731-6. Epub Dec. 18, 2007.

Pasparakis et al., Controlled polymer synthesis--from biomimicry towards synthetic biology. Chem Soc Rev. Jan. 2010;39(1):286-300. doi: 10.1039/b809333b. Epub Oct. 6, 2009.

Phillips et al., A programming language for composable DNA circuits. J R Soc Interface. Aug. 6, 2009;6 Suppl 4:S419-36. doi: 10.1098/rsif.2009.0072.focus. Epub Jun. 17, 2009.

Pinzani et al., BRAFV600E detection in melanoma is highly improved by COLD-PCR. Clin Chim Acta. May 12, 2011;412(11-12):901-5. doi:10.1016/j.cca.2011.01.014. Epub Jan. 22, 2011.

Ramsay, DNA chips: state-of-the art. Nat Biotechnol. Jan. 1998;16(1):40-4.

Rothemund, Folding DNA to create nanoscale shapes and patterns. Nature. Mar. 16, 2006;440(7082):297-302.

Santalucia JR et al., The thermodynamics of DNA structural motifs. Annu Rev Biophys Biomol Struct. 2004;33:415-40.

Schaus, Broadening Access to DNA-Based Self-Assembly. Centre de Recherches Interdisciplinaires (CRI). Jul. 11, 2011 Presentation.

Seelig et al., Enzyme-free nucleic acid logic circuits. Science. Dec. 8, 2006;314(5805):1585-8.

Seeman, An overview of structural DNA nanotechnology. Mol Biotechnol. Nov. 2007;37(3):246-57. Epub Jul. 12, 2007.

Shih et al., Knitting complex weaves with DNA origami. Current Opinion in Structural Biology. Jun. 2010;20(3):276-82. Author manuscript available in PMC Jun. 1, 2011.

Smith et al., Overstretching B-DNA: the elastic response of individual double-stranded and single-stranded DNA molecules. Science. Feb. 9, 1996;271(5250):795-9.

Soloveichik et al., DNA as a universal substrate for chemical kinetics. Proc Natl Acad Sci U S A. Mar. 23, 2010;107(12):5393-8. doi:10.1073/pnas.0909380107. Epub Mar. 4, 2010.

Yin et al., Programming biomolecular self-assembly pathways. Nature. Jan. 17, 2008 ;451(7176):318-22. doi: 10.1038/nature06451.

Yin et al., Programming DNA tube circumferences. Science. Aug. 8, 2008;321(5890):824-6.

Zadeh et al., NUPACK: Analysis and design of nucleic acid systems. J Comput Chem. Jan. 15, 2011;32(1):170-3. doi:10.1002/jcc.21596.

Zhang et al., Control of DNA strand displacement kinetics using toehold exchange. J Am Chem Soc. Dec. 2, 2009;131(47):17303-14.

Zhang et al., Dynamic DNA nanotechnology using strand-displacement reactions. Nat Chem. Feb. 2011;3(2):103-13. doi: 10.1038/nchem.957.

* cited by examiner

*Double-stranded polymers of each base type*

*Three-arm junctions of each base type*

External agitation

Circulation and turbulence

Counter-rotating discs

SEQUENCE LISTING

```
<160> NUMBER OF SEQ ID NOS: 2

<210> SEQ ID NO 1
<211> LENGTH: 36
<212> TYPE: DNA
```

```
<213> ORGANISM: Artificial Sequence
<220> FEATURE:
<223> OTHER INFORMATION: Synthetic Oligonucleotide

<400> SEQUENCE: 1
ccacatacat catcttccct cattcaatac cctacg                              36

<210> SEQ ID NO 2
<211> LENGTH: 27
<212> TYPE: DNA
<213> ORGANISM: Artificial Sequence
<220> FEATURE:
<223> OTHER INFORMATION: Synthetic Oligonucleotide

<400> SEQUENCE: 2
atggagacgt agggtattga atgaggg                                        27
```

COMPOSITIONS AND METHODS FOR SELF-ASSEMBLY OF POLYMERS WITH COMPLEMENTARY MACROSCOPIC AND MICROSCOPIC SCALE UNITS

RELATED APPLICATIONS

This application is a national stage filing under 35 U.S.C. §371 of International Application No. PCT/US2012/046036 filed Jul 10, 2012, which was published under PCT Article 21(2) in English, and which claims the benefit of U.S. Provisional Application Ser. No. 61/506,143, filed on July 10, 2011, both entitled "COMPOSITIONS AND METHODS FOR SELF-ASSEMBLY OF POLYMERS WITH COMPLEMENTARY MACROSCOPIC AND MICROSCOPIC SCALE UNITS", the entire contents of each of which are incorporated by reference herein.

The genome encodes all hereditary information of life, and is constructed from four nucleotides (bases): adenine (A), thymine (T), cytosine (C), and guanine (G) (FIG. 1A). These nucleotides are covalently linked to form aperiodic DNA polymers, known as DNA strands (FIG. 1B). Of these four nucleotides, A binds specifically to T (and vice versa), and G binds specifically to C (and vice versa). The directional arrangement of the nucleotides on the DNA strand is known as the sequence of the strand. The sequences of different DNA strands determine the stability of the binding among the strands.

By designing synthetic DNA strands with custom sequences, researchers in the field of "DNA nanotechnology" are able to build dynamic systems and nanoscale structures through the process of self-assembly (FIG. 1C). The phenomenon requires single-stranded oligonucleotide sequences, carefully designed to share segments of Watson-Crick base complementarity with one or more other segments on the same or different strands. In solution, a system of such strand species follows a kinetic pathway of relatively predictable, dynamic strand pairing, ultimately to a comparably stable configuration of low thermodynamic free energy. The field is rapidly developing, with applications broadly separated into domains of structure assembly (Seeman, N. C. *Mol Biotechnol* 37, 246-257 (2007)), including the "DNA Origami" method (Shih, W. M. et al. *Curr. Opin. Struct. Biol.* 20, 276-282 (2010)) and dynamic information-processing (Zhang, D. Y. et al. *Nature Chem* 3, 103-113 (2011)). Researchers have demonstrated the self-assembly of spheres (Douglas, S. M. et al. *Nature* 459, 414-418 (2009)), boxes (Andersen, E. S. et al. *Nature* 459, 73-76 (2009)), and arbitrary two dimensional shapes (Rothemund, P. W. K. *Nature* 440, 297-302 (2006)), as well as dynamic circuits acting as molecular logic gates (Seelig, G. et al. *Science* 314, 1585-1588 (2006)) and oscillators (Soloveichik, D. et al. *PNAS* 107, 5393-5398 (2010)). The structural and dynamic domains can be combined; dynamic signals used to alter structures in situ have ranged from chemical, via DNA strand displacement (Soloveichik, D. et al. *PNAS* 107, 5393-5398 (2010)), to mechanical, via shear stresses in blood (Hariadi, R. F. et al. *Phys. Rev. E* 82, 046307 (2010)). Precise methods of DNA tube generation (Yin, P. et al. *Science* 321, 824-826 (2008)) and of autocatalytic structure growth (Yin, P. et al. *Nature* 451, 318-322 (2008)) have also been demonstrated. Predictability of DNA circuit function is high. With the development of experimental techniques and reliable thermodynamic (SantaLucia, J. et al. *Annu. Rev. Biophys. Biomol. Struct.* 33, 415-440 (2004)) and kinetic (Zhang, D. Y. et al. *J. Amer. Chem. Soc.* 131, 17303-17314 (2009)) data and modeling (Phillips, A. et al. *J. Royal Society Interface* 6, S419-S436 (2009); Zadeh, J. N. et al. *J. Comput. Chem.* (2010).doi:10.1002/jcc.21596), nucleic acid circuit design is being transformed into a true engineering discipline.

The key property of DNA that enables self-assembly of these complex structures is the sequence-specific binding of DNA. While there are only four complementary bases, the potential number of unique strands of length "N" bases rises with $N^4$, giving an enormous potential number of unique building blocks. The strands of DNA are themselves flexible and may exhibit piece-wise association with complementary sections of other strands, but chemical mixing and dissociation reactions driven by thermal energy ensure that the most energetically-favorable match in a system will ultimately be found.

SUMMARY OF INVENTION

The invention is premised, in part, on the discovery that other materials may be designed that exhibit sequence-specific binding. In accordance with the invention, sequence-specific binding and self-assembly can be programmed into a variety of synthetic polymer based systems of various scales and complexity. Polymer systems composed of concatenated monomers, where each monomer ranges in size from ~10 nm to 10 m can be designed and self-assembled using the methodology provided herein.

The aperiodic polymers of the invention comprise distinct individual monomers manufactured in linear strands of varying length, and are capable of self-assembly with complementary regions of other polymers (or the same polymer, in some instances) under a randomizing energy that both mixes the polymers sufficiently and overcomes the weak individual "activation energies" between bound and separate synthetic monomers. In some instances, a trigger such as an externally applied condition may be required to initiate assembly.

The invention thus provides, inter alia, compositions and methods for constructing macroscopic structures via self-assembly processes. The invention contemplates use of polymers comprising monomers (which may be referred to as bases) capable of specific yet individually weak interactions with complementary monomers. Different monomers are arranged in sequence on a structural backbone to form aperiodic macropolymers. It was found, according to the invention, that these macropolymers spontaneously assembly into pre-programmed structures, as determined by the monomer sequence in each macropolymer. The self-assembly methods of the invention can be performed without the need for complex and/or costly equipment. In addition, these methods facilitate high throughput assembly due to intrinsic parallelism that can be achieved.

Thus, in one aspect, the invention provides in one aspect a synthetic, non-nucleic acid polymer comprising a plurality of heterogeneous monomers attached to a backbone in a non-random manner, that may be linear or non-linear. Each monomer in the plurality of monomers binds preferentially to its complementary monomer. The complementary monomer may be on a different region of the same polymer or on a physically separate polymer.

In some embodiments, the polymer is a linear polymer. It may be unbranched or it may be a branched polymer.

In some embodiments, the backbone is comprised of nucleic acid, a polymeric compound such as polydimethylsiloxane (PDMS), plastic, paper, wood, metal, cotton, natural or synthetic fabrics, or a combination thereof.

In some embodiments, the polymer comprises from 2 to 100 different monomers. In some embodiments, the monomers may comprise one or more nucleic acids, or a plurality (i.e., more than one) nucleotide or nucleoside, or a combination of nucleic acids, nucleotides or nucleosides with one or more other materials.

In some embodiments, individual monomers in the plurality of heterogeneous monomers are comprised of nucleic acid, polymeric compounds, plastic, glass, hydrogel, metal, ceramic, wood, oxide such as aluminum oxide or silicon oxide, semiconductor material such as silicon, or a combination thereof. In some embodiments, individual monomers are comprised of nucleic acid nanostructures, which may in turn be self-assembled. In some embodiments, individual monomers are comprised of hydrogels. In some embodiments, monomers are comprised of an identical material. In some embodiments, individual monomers in the plurality of heterogeneous monomers range in size from 10 nanometers to 10 meters.

In some embodiments, one or more individual monomers in the plurality are permanently attached to the backbone (e.g., through covalent bonds). Individual monomers may be attached directly or indirectly to the backbone.

In some embodiments, individual monomers are attached to the backbone by an adhesive, a molten material, a mechanical fitting, or a natural or engineered molecular interaction (e.g., a chemical bond between substituents inherently present in the backbone and monomer).

In some embodiments, individual monomers further comprise an attachment moiety or means that facilitates binding of the monomer to its complementary monomer. In some embodiments, individual monomers bind to their complementary monomers using van der Waals forces, hydrogen bonds, ionic bonds, covalent bonds, hydrophobicity, electrostatic or magnetic attraction, shape complementarity, mechanical fitting such as but not limited to a fabric hook and loop fastener (e.g., Velcro).

In some embodiments, individual monomers do not bind to each other but instead enable or prevent the binding of other attractive components by way of their geometry or other characteristics.

In another aspect, the invention provides a composition comprising one or more of the aforementioned polymers. In some embodiments, the composition comprises a plurality of the aforementioned polymers, wherein each of the polymers in the plurality binds to at least one other polymer in the plurality. The plurality may comprise 2, 3, 4, 5, 6, 7, 8, 9, 10 or more different polymers.

In another aspect, the invention provides a method comprising contacting a plurality of the aforementioned polymers, under conditions that allow spontaneous self-assembly based on sequence-specific binding between separate polymers. In some embodiments, the method results in the formation of a structure having micron dimensions. In some embodiments, the method results in the formation of a structure having millimeter dimensions. In some embodiments, the method results in formation of a structure having centimeter dimensions.

In some embodiments, the plurality of polymers are contacted in a fluid environment such as a liquid (e.g., water or other aqueous liquid), a gas (e.g., air), or in a vacuum.

In some embodiments, the conditions comprise an externally applied physical force or kinetic energy. In some embodiments, the conditions comprise an internal physical force or energy such as may be imparted by the medium or environment in which the polymers are present. The force or energy, whether external or internal in nature, may be a mechanical perturbation such as shaking, a fluid force such as fluid flow (e.g., turbulent or non-turbulent flow), electromagnetic force, thermal energy, or a combination thereof. The energy imparted by the medium or external forces may be constant in nature, in a distribution of energies about a constant average (as is the case in thermal motion of DNA at a constant temperature), or temporally varying in distribution of average.

In another aspect, the invention provides a method comprising binding a first and a second synthetic, non-nucleic acid polymer (of any of the aforementioned polymers) to each other, wherein the polymers bind to each other through specific interactions of two contiguous monomers on the first polymer with two contiguous, complementary monomers on the second polymer. Much as with DNA "base stacking," in such a case two complementary monomers may not themselves attract each other, but instead merely allow for the stabilizing attraction of the backbone, other aspects or surfaces of the monomers, or other components of the polymer. In one embodiment, the polymers bind to each other through specific interactions of three contiguous monomers on the first polymer with three contiguous, complementary monomers on the second polymer. In one embodiment, the method comprises binding additional synthetic, non-nucleic acid polymers to each other, through specific interactions of two or three or more contiguous monomers on each polymer to two or three or more contiguous complementary monomers on another polymer.

In some embodiments, repulsive or destabilizing forces may be present in competition with the stabilizing forces allowed or generated by complementary segments of adjacent polymers. Such destabilizing forces may be electromagnetic, as in the case of same-polarity magnets, mechanical, or other, and may originate in the monomers, backbone, or other polymer components.

The number of monomer types may be 4 (2 complementary pairs), as with natural nucleic acids, or it may be 2, 3, 4, 5, 6 or any other number of monomer types. The monomer types may be arranged primarily into pairs, where each pair substantially complements only each other, or a particular monomer may substantially and stably pair with more than one other monomer, in a partially or fully complementary form.

In another aspect, the invention provides a method for macroscopic construction of a pre-determined structures comprising spontaneous self-assembly of aperiodic synthetic, non-nucleic acid polymers comprising a sequence of monomers, wherein individual monomers possess specific yet weak and reversible binding to complementary monomers. The sequence of monomers in a polymer determines the polymer's interaction and affinity with one or more separate polymers. A polymer may also bind to itself, in some embodiments.

In some embodiments, monomers may provide kinetic energy for self-assembly.

In another aspect, the invention provides a plurality of synthetic polymers each comprising a backbone and one or more self-assembled monomers, wherein individual polymers in the plurality bind to one or more other polymers in the polymer by self-assembly.

In another aspect, the invention provides a method comprising self-assembly of synthetic, non-nucleic acid polymers into dynamically reconfigurable structures, through the use of monomers that are themselves dynamically reconfigurable. In some embodiments, monomers reconfigure through a process of mechanical reconfiguration, polarity inversion of electromagnetism, electric/magnetic field strength modulation, internal control, or combinations thereof. In some embodiments, reconfiguration of monomer units is triggered by an internal clock/timer, an external electrical, optical, or radio signal, or as a programmed response to its environment sensed through one or more embedded sensors.

DETAILED DESCRIPTION OF INVENTION

Figure 1A:
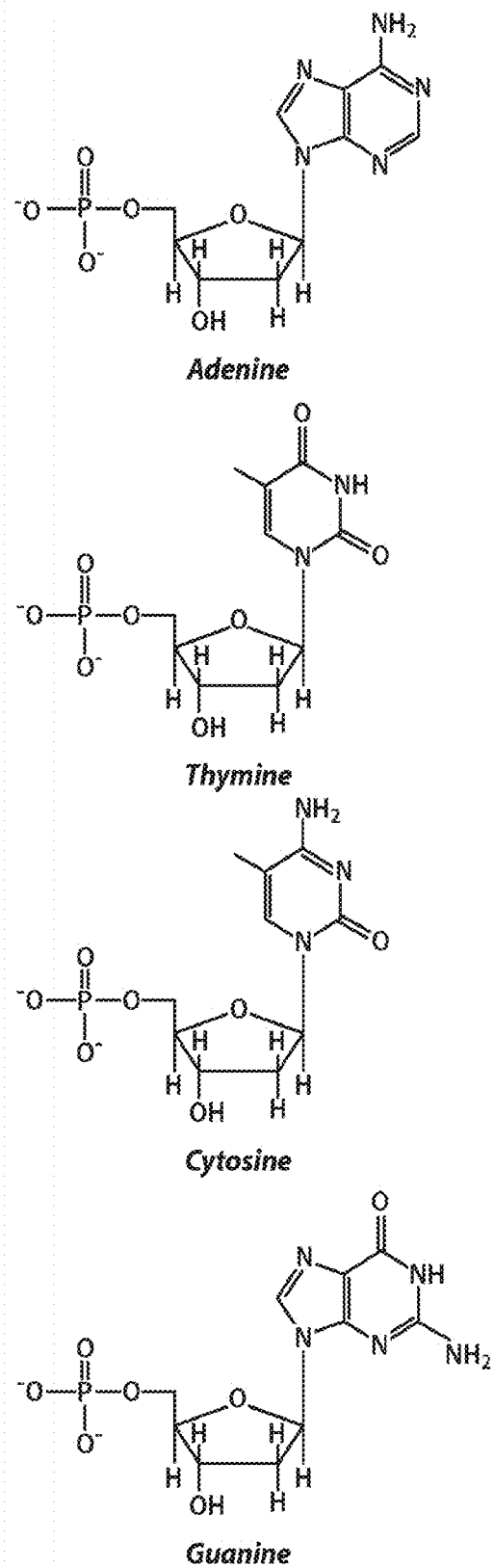
FIG. 1. (A) The structure of DNA nucleotides, (B) Polymers of nucleotides comprising DNA strands, with equivalent notations (Top and Bottom Strands: SEQ ID NOs.: 1 and 2), and (C) Self-assembled two-dimensional (2D) and three-dimensional (3D) DNA structures.
Figure 1B:
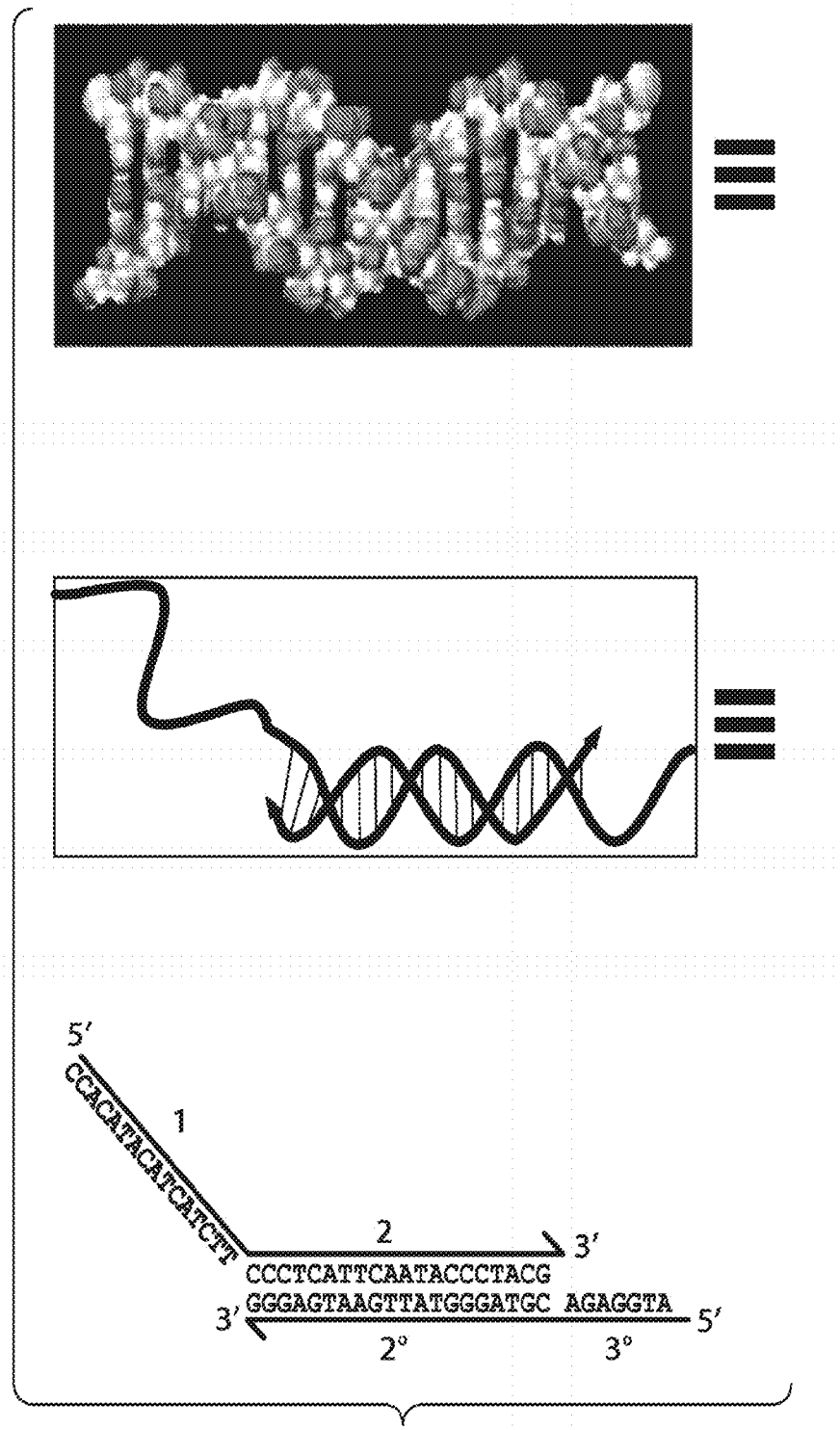
Figure 1C:
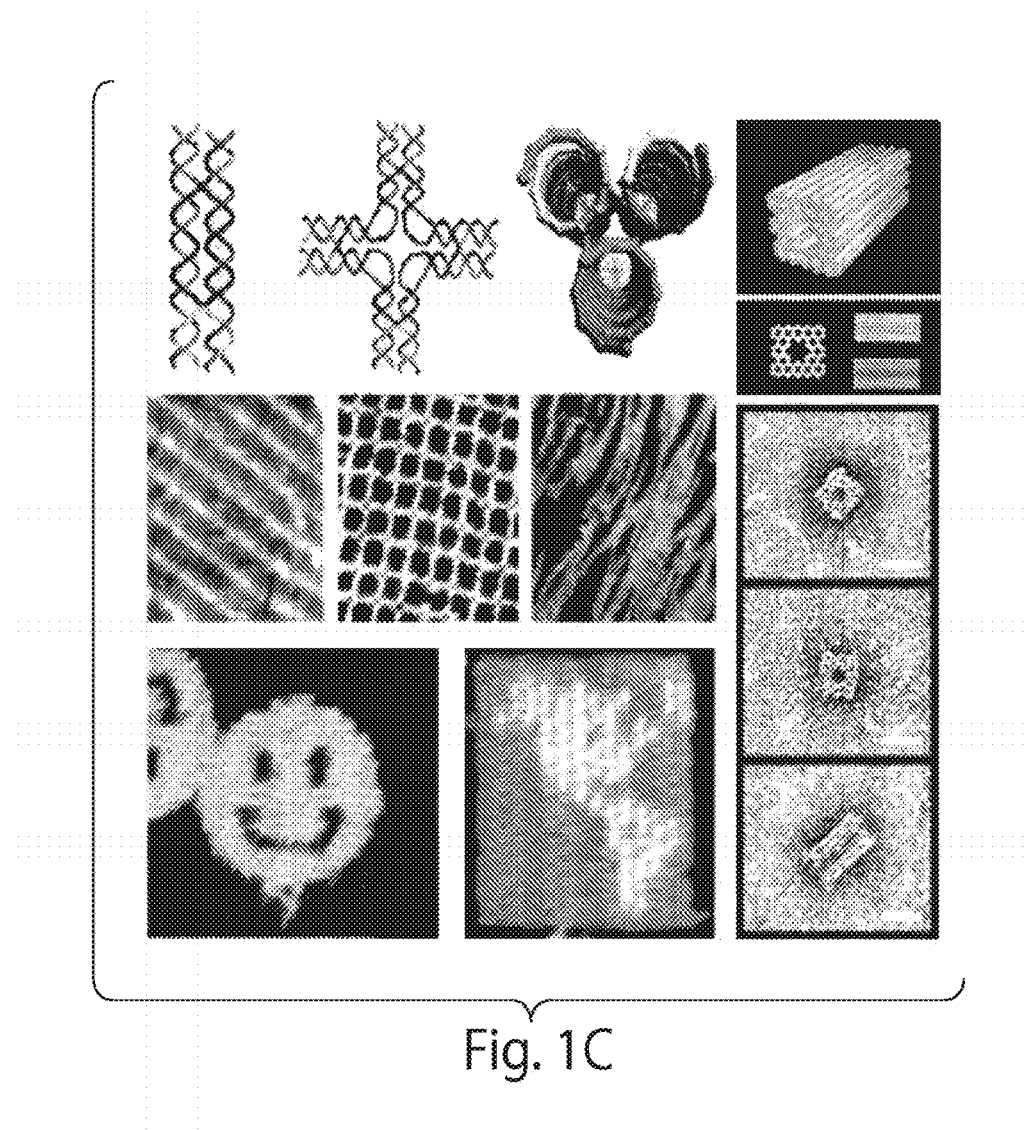

The invention provides, in its broadest sense, compositions and methods for self-assembly of structures. More specifically, the invention provides compositions comprising synthetic, non-nucleic acid polymers having a backbone and attached thereto a particular predetermined sequence of monomers. An individual monomer will have the ability to bind, albeit weakly, to a specific complementary monomer present on a separate synthetic polymer. A sequence of monomers therefore will bind to a specific complementary sequence of monomers present on a separate synthetic polymer or on another region of the same polymer. The strength of binding (e.g., binding of a contiguous sequence) between separate polymers (or different regions of the same polymer) will depend, in part, on the number of contiguous complementary monomer pairs: the greater the number of complementary monomer pairs, the greater the binding energy and thus the strength of stability.

The present invention uses micro-, meso- and macro-scale components as monomers attached to backbones to form synthetic engineered polymers that are able to self-assemble. The polymers are not nucleic acids (i.e., their monomers are not simply single nucleotides or nucleosides or nucleic acid bases). The polymer may comprise nucleic acids, as described in greater detail below.

The invention is based, in part, on the finding that a plurality of these synthetic polymers self-assemble and form structures of various size and complexity when combined under conditions that allow members of the plurality to associate with other members of the plurality based on monomer sequence complementarity. The present invention can be distinguished from earlier reports of self-assembly based, at least in part, on the use of a plurality of connected monomers that dictate specificity and function and enable the formation of higher order structures of greater complexity than can be achieved through the use of individual physically separate building blocks. It can also be distinguished in terms of the mechanisms used to bind the polymers, the nature of the contemplated polymers, the size range of the polymers, and the mechanisms of randomizing energy applied.

In addition, while current assembly strategies for macroscopic architecture requires step-by-step external guidance to arrange building blocks in specific positions, construction via self-assembly is not dependent upon external control, and it therefore is attractive for use in remote construction as an example.

Synthetic Polymers

The invention provides synthetic polymers having a backbone and attached thereto, in a linear manner, a plurality of different monomers. The term polymer intends a single-stranded structure. As will be discussed in greater detail herein, such polymers are able to bind to one or more other polymers (or in some cases even to themselves) to form double stranded structures, triple stranded structures, and higher order structures. As discussed in greater detail herein, each monomer will have a complementary monomer to which it preferentially, and in some instances specifically, binds.

The polymer is not a naturally occurring polymer (i.e., it is non-naturally occurring). In all instances, the monomers do not consist of individual nucleotides or nucleosides or nucleic acid bases. Rather, as discussed in greater detail below, the monomers may comprise nucleic acids. For example, a monomer may be a nanostructure formed from one or more nucleic acids, or a monomer may be or may comprise a plurality of identical single stranded nucleic acids. Therefore the polymer may be referred to as a "non-nucleic acid" polymer. The polymers may be branched or unbranched linear polymers.

The monomer sequence governs the interaction(s) of the polymer with one or more other polymers. The invention contemplates that any given polymer may bind to one or more other polymers simultaneously to generate two-and three-dimensional structures.

The length of the polymer will depend upon the particular embodiment. Polymer length may be expressed in terms of monomer number since such monomers are arranged linearly. In some embodiments, the polymers may be 5, 10, 15, 20, 25, 30, 40, 50, 60, 70, 80, 90 or 100 monomers in length. In some embodiments, the polymers may be 100, 200, 300, 400, 500, 600, 700, 800, 900, or 1000 monomers in length. In some embodiments, the polymers may have more than 1000 monomers. The length of the polymer may also be expressed by the distance between its ends. In some embodiments, the polymer length may be on the order of micrometers, millimeters, centimeters, decimeters, or meters.

Some aspects of the invention contemplate the use of polymers of identical or similar lengths. Some aspects of the invention contemplate the use of polymers of differing lengths. As an example, the invention contemplates the use of one (or a few) long polymers together with many shorter polymers. In these embodiments, each of the shorter polymers may bind to two or more regions of the longer polymer, thereby securing or stabilizing the folded configuration of the longer polymer. In another example, an entire self-assembled structure may be formed of a large number of relatively short polymers of equal or similar length.

Backbone

The synthetic polymers of the invention comprise a backbone. Preferably the backbone is sufficiently flexible and capable of bends and other non-linear configurations.

The backbone dimensions will vary depending on the particular embodiment and the size and weight of the monomers, the strength of the monomer interactions, and/or the randomizing energies present. Typically, the length, depth and width of the backbone may range from microns to meters, including millimeters, centimeters, and decimeters.

The backbone composition will also vary depending on the particular embodiment and the composition and weight of the monomers. It will be understood that the backbone should be composed of a material (or materials) to which monomers can be attached, either directly or indirectly, in a stable manner. The backbone may therefore be comprised of nucleic acids such as DNA, plastics, paper, or metals including doped semiconductors. The backbone composition may include rigid or relatively soft or flexible materials such as rubber, foam, or gel-like materials such as polydimethylsiloxane (PDMS). In some instances, the backbone comprises in whole or in part nucleic acid nanostructures such as rods or tubes formed using DNA nanotechnology techniques such as DNA origami, as described in greater detail below.

Monomers

The synthetic polymers of the invention comprise monomers attached to the backbone. The monomers are attached in a pre-determined and thus non-random liner arrangement or sequence. It is this pre-determined sequence that allows an end user to program a self-assembly process.

The invention contemplates that any number of complementary monomer pairs may be used in any given application. In some instances, the invention contemplates polymers having 4 different monomers that constitute 2 different specific monomer pairs. In some instances, the invention contemplates polymers having 6 different monomers that constitute 3 different monomer pairs. One of ordinary skill in the art will recognize that even higher numbers of different monomers and different monomer pairs are possible. One of ordinary skill in the art will also recognize that sufficient specificity between polymers can be achieved when using low numbers of different monomers and monomer pairs, since relatively unique and infrequent sequences can be designed using even 4 different monomers.

As with natural nucleic acids, monomers may form partially or fully stabilizing pairs with more than one other monomer type. While some monomer pairs will have an attractive, stabilizing effect on the polymer, other pairs will have repulsive or destabilizing effects.

The shape, size and composition of the monomers will depend on the particular embodiment and application. In some instances, complementary monomers may have complementary shape or surface features, as shown below. As an example, both monomers in a monomer pair may have relatively square shapes but may differ from each other at the surfaces at which they interact. One monomer may have a concave surface and the other may have a convex surface. Examples of such monomers are provided in the Examples. In other instances, all paired shapes may be structurally compatible but magnetic, chemical, or other forces generated between monomers or other components of the polymer may differentiate the pairs.

Monomers may comprise one or more materials. These materials include but are not limited to nucleic acids (e.g., DNA), hydrogels, plastics, paper, metals including doped semiconductors, oxides, glass, wood, and the like. Materials may include rigid or relatively soft or flexible materials such as rubber, foam, or PDMS.

Monomers comprising nucleic acids may be "nucleic acid nanostructures" (i.e., 2D and 3D structures comprised of one or more nucleic acids and typically having dimensions in the nanometer range (typically 3-100 nm)). In other embodiments, the monomers may be nucleic acid microstructures (i.e., 2D and 3D structures comprised of one or more nucleic acids and typically having dimensions in the micron range (typically 3-100 microns)).

Typically, monomers of identical or similar size and identical composition (but not necessarily identical shape or identical attachment means, as described herein) are used on an individual polymer and on a plurality of polymers that will self-assemble together. Thus, while the invention contemplates that the monomers may be made of a variety of materials, generally in any given application the polymers used will comprise monomers of about the same size and of the same composition that bind to their complements in about the same manner (e.g., shape complementarity). As an example, polymers used in a particular application typically will comprise plastic monomers of about the same size. This uniformity between monomers and thus polymers better ensures that binding between polymers (or between regions of the same polymer) occurs at a number of contiguous complementary monomer pairs rather than at one or more dominant monomer pairs in sequence.

In some embodiments, monomers on a single polymer are heterogeneous, meaning that the monomers will not be identical to each other in all respects. In some embodiments, the polymer will comprise two different monomers. In some embodiments, the polymer will comprise three different monomers. In some embodiments, the polymer will comprise four different monomers. "Different" monomers in this respect intends that the monomers will have different complementary monomers. The contiguous linear arrangement of different monomers yields a monomer sequence that dictates the identity of the polymer and its binding interactions with other polymers.

The art is familiar with the manufacture of micro-, meso- and macro-scale components. The invention contemplates the use of such micro-, meso-and macro-scale components as monomers in the compositions and methods provided herein. U.S. Pat. No. 5,355,577 describes individual, physically separate microelectronic components. U.S. Pat. No. 6,507,989 describes systems of meso-scale objects. U.S. Pat. No. 7,007,370 describes the utilization of the self-assembled macroscopic structure as an electrical circuit. Others have reported the construction of a macroscopic viral capsid model from twelve individual, unconnected components through shaking (Olson, A. J. et al. *PNAS* 104, 20731-20736 (2007)). The dimensional size of each individual building block in these reports ranges from several microns to centimeters. The teachings in these references relating to monomeric units and their synthesis are incorporated by reference herein.

Attachment Means

The invention contemplates that a monomer will allow or be able to bind or attach preferentially to a specific and unique complementary monomer (i.e., each monomer will have only one other monomer to which it is able to preferentially bind or attach). In some instances, the conditions of binding may be altered such that a monomer may be able to bind its preferred complement or another type of monomer. The monomer may be inherently capable of binding to its complement (e.g., through shape complementarity), or the monomer may be modified to have an attachment means through which the binding occurs. The attachment means may be present on the surface of monomers, and more particularly on those regions of the monomer surface that are in contact with the complementary monomer.

The attachment means may take a variety of forms and may be, for example, chemical (e.g., ionic, covalent, hydrophobic, van der Waals, hydrogen bonds, and the like; biotin-avidin or streptavidin interaction, or by specially-engineering molecular interactions such as those found in chemical "glues" (Yin, P. et al. *Science* 321, 824-826 (2008)), electro/magnetic phenomena, mechanical fittings (e.g., Velcro, hooks, latches, or other couplings, possibly utilizing springs, masses, or dampers), or other methods.

The invention contemplates that complementarity between monomers can be a function of the monomer shape and size, attachment means type and configuration, or a combination thereof. In some important embodiments, complementary specific binding between monomers is achieved using shape-complementary and surface-selective building strategy. Reference can be made to U.S. Pat. Nos. 5,355,577, 6,507,989 and 7,007,370 and Olsen et al. PNAS, 104:20731-20736 (2007) for various surface-selective binding strategies. Reference can also be made to Yin et al. Science 321:824-826 (2008) for "chemical glue" technology that may be used as attachment means in the invention. The teaching of this reference relating to this chemical glue technology is incorporated by reference herein.

As illustrated in the Examples, a first monomer of a complementary monomer pair may be surface-modified to include magnets in a particular arrangement or configuration, and a second monomer of the pair may be surface-modified to include the minor image magnetic configuration and opposite N/S polarity. In this instance, the monomers bind to each other specifically and selectively when they come into contact due, in part, to the particular configuration of their attachment means. In some embodiments, the nature of the attachment means will be identical for all monomers in a given application (i.e., all the monomers will comprise a magnetic attachment means, or all polymers will comprise a mechanical attachment means (e.g., Velcro)). However, the physical configuration or arrangement of such means on each monomer may be different particularly if the attachment means contributes to the uniqueness and binding specificity of the monomer.

Typically, the binding between two complementary monomers is relatively weak and insufficient to bind two polymers to each other in a stable manner. Accordingly, in order for two polymers to bind to each other stably, it is necessary for a number of contiguous monomers on a first polymer to bind to their complementary monomers arranged contiguously in and in the same sequence on a second polymer (or on a different region of the first polymer). The invention contemplates that strength and specificity of binding between two separate polymers (or two regions of the same polymer) will be a function of the binding strength of individual monomer pairs and the number of contiguous complementarity monomers pairs that can be formed between two polymers. Further stability to a structure may be imparted by non-contiguous complementary segments. In some embodiments, at least 4 monomer pairs, at least 6 monomer pairs, at least 8 monomer pairs, or at least 10 monomer pairs must exist, preferably, in a contiguous manner in order for two polymers to interact stably. The binding strength of a monomer pair will also depend on the mass (or weight) of the polymers and monomers. In some instances, the greater the mass of the polymers and monomers, the stronger the monomer-monomer binding strengths in order to ensure stable binding between polymers.

The binding strength between monomers of a monomer pair will be enough to hold the monomers of the pair together under low levels of randomizing input energy, but not under high levels, allowing for short, incompletely matched (e.g., mismatched) segments of a polymer to hybridize transiently. Longer segments of hybridized complementary pairs will exhibit a higher net stability than shorter segments. The binding energy attributed to an individual monomer pair may be as low as +/−1 kcal/mol for the smallest polymers, where the negative value indicates a stable pair and the positive value indicates an unstable (repulsive) pair (i.e., as in the usual description of free energy of hybridized DNA monomers). Binding energies will be correspondingly higher for larger scale polymers, and as high as +/−100 J per bond or more for the largest scale polymer. Perfectly matched monomer pairs will generally have the most stable energy gains, though in some cases imperfect matches (e.g., mismatches) will also add stability to a pairing of strands.

It is to be understood that preferably the binding strength of different monomer-monomer pairs will not differ by an order of magnitude or more. For example, the binding strengths between different monomer pairs used in one application may differ from each other by less than 0.1%, less than 0.5%, less than 1%, less than 5%, less than 50%, less than 100%, less than 200%, or less than 500%. In this way, no one monomer pair overwhelmingly predominates or governs the interactions that a polymer makes with another polymer (or that one region of a polymer makes with another region of a polymer). Instead the invention intends that polymers will interact with other polymers typically only when the polymers share a significant degree of monomer sequence complementarity, preferably with all monomers in a region of the polymer binding to a complementary sequence of monomers on another polymer. This and other features of the polymers and systems of the invention can be easily achieved due to the synthetic and engineered nature of the monomers and polymers. In other words, based on this disclosure, one of ordinary skill in the art can design and fabricate polymers, monomers and attachment means to any particular specification, including ensuring that the binding strengths of different monomer pairs are relatively similar.

The monomers or other components of a polymer may or may not have physical, magnetic, or other features that enforce an anti-parallel hybridization of two polymers. That is, each polymer strand may be non-directional and able to bind other complementary segments regardless of their parallel or anti-parallel orientation, or they may be directional, capable of binding each other only in parallel or anti-parallel directions depending on design.

Self-Assembly Methods

The invention contemplates and provides systems comprising a plurality of polymers that when mixed together under appropriate conditions self-assemble to form 2D and 3D structures. The ability of the polymers to self-assemble enables the formation of 2D and 3D structures without human intervention. This is particularly useful in hazardous or otherwise inhospitable environments. Examples include the earth's atmosphere, outer space, ocean depths, radiation-contaminated areas such as damaged nuclear reactors, disease-infested areas, microscopic environments which are not amenable to directed assembly, and the like. It is also useful in applications where the scale or conditions of assembly make directed assembly difficult or impossible, such as with relatively small or large polymers, or where self-assembly of multitudes of components is desired. The invention contemplates, in some embodiments, that a plurality of polymers is present in the environment and can be triggered to self-assemble based on an event (as in Yin, P. et al., Nature 451, 318-322 (2008)). The event may be the presence of a triggering polymer or some other moiety that acts as a nucleating step in the self-assembly reaction. In other embodiments, a plurality of polymers is introduced into an environment at about the same time and made to self-assemble close in time to their introduction. The self-assembly reaction may occur in a reaction vessel or container.

The nature of the self-assembly conditions will depend upon the nature of the attachment means, the binding strength of the monomer pairs used in the particular application and the environment in which self-assembly will occur. In its simplest form, the invention contemplates that mechanical (or physical) forces and kinetic energy will be sufficient for self-assembly provided such forces and energy allow the polymers in the plurality to move relative to each other and interact with each other sufficiently. It will be understood therefore that self-assembly environments are typically motion-or flow-based environments, and may be gaseous (e.g., air), fluid or vacuum in nature. Forces other than those between monomers or polymers, the polymers and container walls, and fluids and the polymers may play a role in mixing and self-assembly. For example, gravitational forces (i.e., weight) may cause polymers to move downward while fluid motions forces them back upward.

The random forces and energies imparted to the polymer system may be uniform in quantity, of a variable distribution about a constant mean (analogous to thermal motion at a constant temperature), or changing in distribution or average with time. In the latter embodiment, the energy may diminish over time to approximate a "thermal annealing" process, or may increase and decrease in a cyclical pattern over any timescale.

These randomizing energies may lead to the self-assembly of a system via one or more parallel routes (orders or pathways) of assembly, as with DNA origami under thermal annealing, or be directed primarily in one route or order of assembly, as with dynamic DNA circuits (Yin, P. et al., Nature 451, 318-322 (2008)). In the latter, the kinetics of individual reactions are programmed into the polymer design, and assembly typically occurs at a constant average rate of energy input (e.g., constant temperature in DNA self-assembly).

A reaction may incorporate only two polymer species or it may incorporate many species, potentially hundreds or thousands, with one or more copies of each polymer species present.

As will be understood, two polymers may bind to each other throughout their length or through only a portion of their lengths, or through the entire length of one polymer and only a portion of the other polymer. Some polymers may be bound to only one other polymers, while some polymers may be bound to a number of other polymers including 2, 3, 4, 5, 6, 7, 8, 9, 10 or more polymers. As an example, in one self-assembly contemplated by the invention, a single long polymer is bound to 5, 10, 15, 20, 25, 50, 100 or more shorter polymers. The long polymer may be 10, 100 or 1000 fold longer than the shorter polymers.

Binding between polymers occurs through the interaction of at least two contiguous monomers on one polymer with at least two contiguous and complementary monomers on a second polymer. The at least two contiguous monomers on the first polymer may be 2, 3, 4, 5, 6, 7, 8, 9, 10, 15, 20, 25, 50 or more contiguous monomers, and correspondingly the at least two contiguous and complementary monomers on the second polymer may be 2, 3, 4, 5, 6, 7, 8, 9, 10, 15, 20, 25, 50 or more contiguous and complementary monomers. Various related embodiments are illustrated in FIGS. 2-8. Examples of mechanisms that can provide the randomizing energy required for self-assembly are provided in FIG. 9.

Various exemplary aspects and embodiments of the invention are discussed in greater detail below. It is to be understood that these embodiments are provided for exemplary purposes only and that are not to be considered limiting with respect to the invention.

1. Meta-DNA

Figure 2:
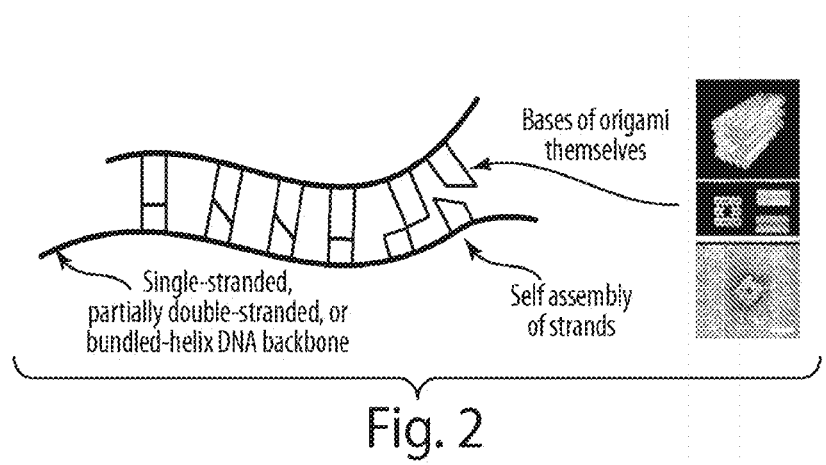
FIG. 2. Nanometer-to-micrometer macropolymer self-assembly via "meta-DNA" structures.

Synthetic polymers on the nanometer to micrometer scale are provided by the invention. The invention contemplates, in some aspects, synthetic polymers that themselves can be created by self-assembly by utilizing DNA nanotechnology to create and position monomers along the length of a nucleic acid (e.g., DNA) backbone. Such as system is referred to herein as a "meta-DNA" system and is shown in FIG. 2.

Current DNA nanotechnology allows the construction of scaffolded (Douglas, S. M. et al. Nature 459, 414-418 (2009), Rothemund, P. W. K. Nature 440, 297-302 (2006)) and un-scaffolded (Yin, P. et al. Science 321, 824-826 (2008)) 2D and 3D origami structures over the nanometer-to-micrometer scales. These origami structures (also referred to herein as nucleic acid (or DNA) nanostructures or microstructures) can be pre-formed by the usual methods into monomers of specific shapes. Non-specific binding has been observed between origami structures with large complementary areas (e.g., typically flat areas, due to the summation of many small base stacking interaction forces). This phenomenon can be used to associate origami structure monomers with complementary shapes due to the high monomer-monomer interaction. Origami structures having shapes that do not allow close association will not show such association.

Artificial monomers comprised of nucleic acid (or DNA) origami structures (or nanostructures) can be used in the polymers of the invention. The invention contemplates that the origami monomers will have regions of complementarity with a backbone that itself may be a single-stranded nucleic acid (such as a single strand of DNA), a double-stranded nucleic acid (such as a double stranded DNA) or a nucleic acid nanostructure (such as a DNA nanostructure), and will therefore be able to self-organize in sequence along the backbone based on that complementarity. Intervening sequences between the nucleic acid nanostructure monomers may be single or double stranded, or even bundles of DNA helices, depending on the stiffness properties required of the backbone. Accordingly, the invention contemplates a polymer having a nucleic acid backbone having attached thereto a plurality of nucleic acid nanostructures. The nanostructures are not single nucleotides or nucleosides and are rather 2D or 3D structures comprised of two more nucleic acid polymers, and typically made using DNA nanotechnology techniques such as origami, tiling, and the like.

It is to be understood that the nucleic acid nanostructures can be synthesized in situ on the nucleic acid backbone or they may be added in a separate stage. Reference can be made to the techniques in the art for manufacturing semiconductor structures directly on a semiconductor surface (Cho, J. et al. *Small* doi:10.1002/smll.201100568). Thus, in addition to manufacturing such monomers in situ on the backbone, monomer patterns may be detailed onto the backbone surface.

In these and other embodiments, the energy input required for mixing and association/dissociation may be thermal energy at smaller scales, or fluid flow at larger scales. Fluid flow represents an analog of thermal energy, as turbulent eddies push segments of the polymer in random directions, and the kinetic energy and forces exerted on the segments can be used to form and break individual bonds. The flow and turbulence can be created by a series of jets directing fluid in the reaction container, other structures such as blades or particles moving within the container to randomize bulk flow, or microfluidics technologies. Transient electromagnetic fields may be applied to the reaction container in order to provide energy directly to the polymer or indirectly, via reactive particles in the fluid.

2. Hydrogels

Figure 3A:
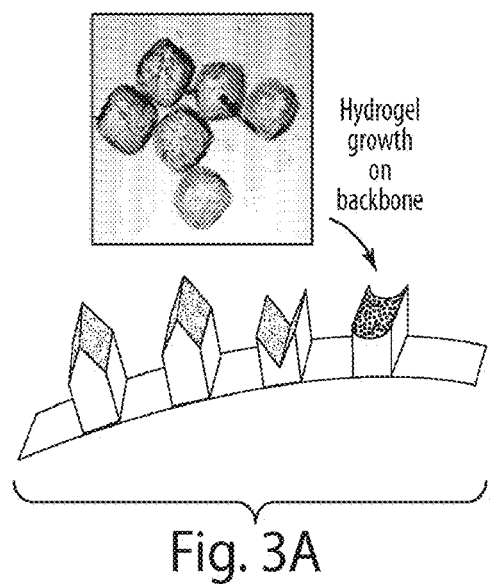
FIG. 3. (A) Hydrogel and (B) sequence-printing approaches to micrometer-to-millimeter macropolymer assembly.

Synthetic polymers on the micrometer to millimeter scale are also provided by the invention. Such polymer may be made using techniques such as but not limited to photolithography applied to hydrogel growth (Du, Y. et al. *PNAS* 105, 9522 (2008)). Hydrogel monomers may be manufactured in arbitrary shapes, with complementary monomers forming pairs as shown in FIG. 3A. Their affinity may be tuned by the application of different levels and strengths of "chemical glues" to complementary surfaces (Yin, P. et al. *Science* 321, 824-826 (2008)). The hydrogel bases may be manufactured directly onto a plastic or other suitably flexible backbone material. Energy input may be transmitted via the surrounding fluids, as described above, with turbulence or via external application of electromagnetic fields.

Figure 3B:
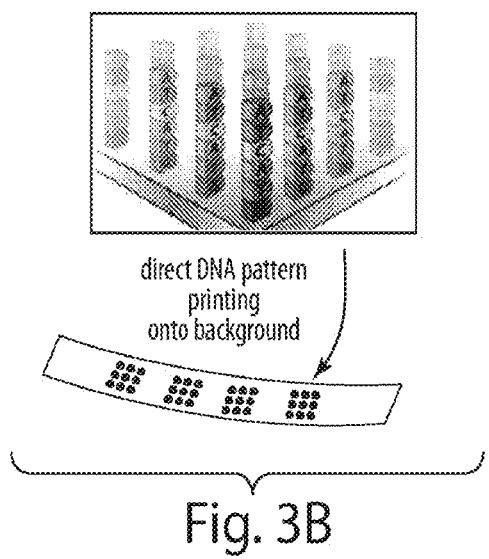

Another method of manufacturing macropolymers on this scale is to use a plurality of nucleic acid (e.g., DNA) single strands as the monomer, and a synthetic material (e.g., most simply a plastic strip) of appropriate size, flexibility, and other properties as the backbone. This embodiment is illustrated in FIG. 3B. DNA "gene chip" printing technologies may then be used to print the desired sequences that comprise a monomer at each position along the backbone (Ramsay, G. *Nat Biotech* 16, 40-44 (1998)). Printing technologies include dip-pen, photolithography, inkjet, or electrochemistry/microelectrode approaches. Specific and complementary binding would then occur between monomers that have complementary nucleic acid sequences. In this instance, binding occurs by virtue of hybridization between a plurality of nucleic acids, at strengths dictated by the number, identity, and length of sequences used (Smith, S. et al. *Science* 271, 795-799 (1996)). Accordingly, in this embodiment, each monomer is comprised of a plurality of identical nucleic acids, and each monomer binds to its complementary monomer via hybridization of those nucleic acids.

The invention also contemplates embodiments in which the monomer is comprised of a nucleic acid material and is modified to include as its attachment means one or more identical nucleic acids. In other words, the plurality of nucleic acids may be used as the monomer or as the attachment means depending on the embodiment.

3. Mechanical Structures

Figure 4A:
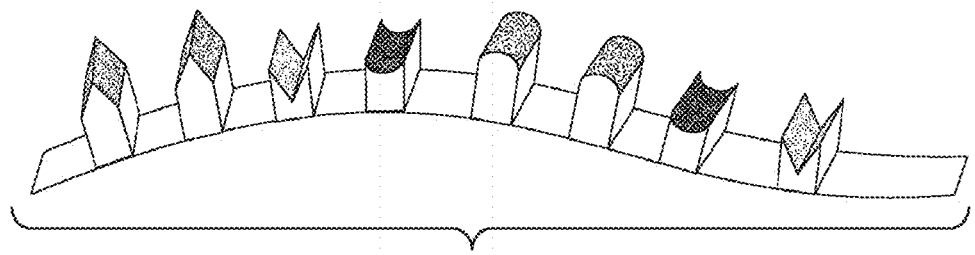
FIG. 4. (A) Assembly of general millimeter-to-decameter scale monomers into polymers, and (B) a method for forming helical polymers from amorphous individual strands.

Synthetic polymers on the order of a millimeter or larger in scale are also provided by the invention. Polymers of this scale and their corresponding monomers may be made using traditional mechanical manufacturing techniques. For example, monomers may be structures having complementary shapes, with flexible magnets applied to their surfaces such that only complementary pairs allow for significant affinity (FIG. 4A). Other mechanical attachments may be used as well, including any arrangement of latches, hooks, hook-and-loop fasteners, springs, and dampers. As an example, a spring may mediate a moderate-strength affinity for complementary bases via a "ball-lock" mechanism (FIG. 4). Shape complementarity may play a major role in mediating any of these forces.

Figure 4B:
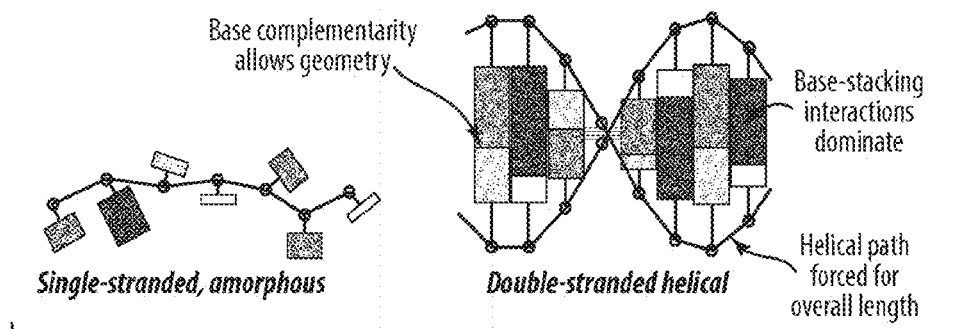

In these and other embodiments, simple backbones such as plastic or metal strips may be used. Alternatively, more complex backbone and base geometries that allow for 3D helical structure upon binding of two polymers to each other may be used. The invention contemplates that polymer rigidity can be increased by binding two relatively flexible individual strands to each other, as occurs in DNA hybridization (FIG. 4B). Similarly, the conformation of the polymer may change upon binding to another polymer. As an example, a relatively linear polymer may adopt a helical conformation upon binding to another polymer, again as occurs with some forms of double stranded DNA. Through shape, magnetic interaction, or other mechanisms, monomers on the macro-scale may be allowed to fit in complementary positions. When a sequence of complementary monomer pairs exists, the monomers attract each other in the axial direction and position themselves with respect to one another for minimum energy, forcing a shortening of the backbone only allowed by a helical path. While 3D structures have been formed without the need for aligning backbone crossover positions between closely-spaced helix bundles (as typically done in origami (Douglas, S. M. et al. *Nature* 459, 414-418 (2009), Rothemund, P. W. K. *Nature* 440, 297-302 (2006)), the helical polymer will allow for these latter designs.

Energy input may be in the form of fluid flow, as above, or in the form of gross mechanical shaking of the reaction container. Mechanical shaking may be purely translational or include a rotational component (akin to a cement mixer). A form of gross mechanical shaking approximating thermal motion on this scale is a system in which beads smaller than the monomers take up the bulk of the 3D space between polymers. A high level of mechanical energy input causes kinetic energy to be transferred from the reaction container to the beads and then to the polymers, exerting on them thermal-energy-like randomizing forces. Energy input for large systems may also be in the form of fluid motion, imparted externally and affecting the motion and interaction of the polymers.

4. Variations

In addition to the aforementioned embodiments, the invention further contemplates variations of these systems. The variations are alternative ways of designing, constructing or energizing these and other systems.

The number of monomers in any system of the invention may be four (resulting in two complementary pairs) or more, or it may be as few as two (resulting in one complementary pair). Depending on the nature of the monomers used, additional monomers may be constructed by changing shapes, spatial patterns of magnetic or other attachment means, chemical content and affinity, and the like. In some embodiments, the strict complementarity of monomers may not be necessary, and it is envisioned that a monomer may pair most favorably with its complement but may also pair with other monomers albeit less favorably. In some embodiments, two monomers may repel each other. It is to be understood that any combination of monomers and monomer pairs is contemplated by the invention.

In more complex variations, the identity of a monomer may change over time. A larger system may, for example, have internal mechanisms that allow programmed or externally-controlled changes in monomer identity and thus complementarity relationships. Properties of the backbone may also be changed by internal or external signals.

Polymers of the invention, including macro-polymers, may adopt helical conformations when double-stranded. Alternatively, they may remain as straight and parallel when associated with another polymer or they may adopt another conformation. Their relative conformation may depend on environmental conditions or local monomer pairing. The mechanical stiffness or other gross properties of the polymer can be expected to change with polymerization, and these properties may be essential to a particular application.

Under some designs or conditions, the polymer may be bind to each other to form a double stranded, or a triple-stranded, or a higher-order structure. Some conditions may allow for the binding or association of the polymers of the invention with other moieties that are not polymers of the invention (e.g., as with DNA-protein interactions). These additional interactions and moieties may confer new properties or capabilities onto the polymers or the structures they form, or they may regulate self-assembly of the polymers. Polymers themselves may also be either linear or, in some cases, branched to any degree.

The length and number of single stranded polymers in any system may vary. In some instances, there may be one relatively long polymer folded into a complex shape by association with many shorter polymers (Rothemund, P. W. K. *Nature* 440, 297-302 (2006)). In some instances, there may be only one relatively long polymer. In some instances, complex structures may be formed simply with many short polymers (Yin, P. et al. *Science* 321, 824-826 (2008)). One or more copies of each polymer may exist in any given system.

The energy that provides for the mixing and association/dissociation of the individual bases can also vary depending on the application and environment. Thermal energy (e.g., at temperatures higher than room or body temperature) can be used for very small systems. Mechanical shaking or other stimulation, electric and magnetic fields, fluid motion and turbulence, and/or other external impingement by larger, moving particles may provide the requisite energy. Some systems may be self-propelled, in that onboard energy sources and mechanisms allow for the perturbation of monomer and backbone position. A system may also be separated such that mixing and association/dissociation energy sources are separate. For example, a varying electric field may mix the system while forces generated internally to the monomers may allow for association and dissociation.

EXAMPLES

Three versions of a centimeter-scale macropolymer system of magnetically-associated bases are described.

Figure 5A:
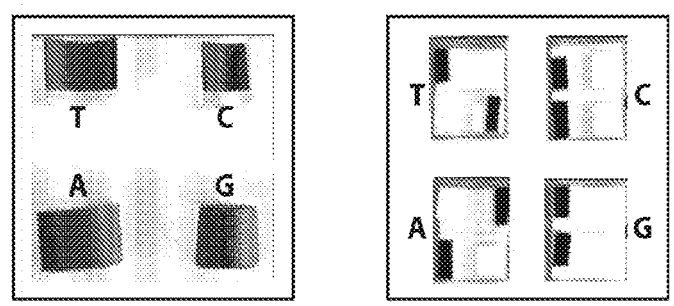
FIG. 5. (A) Two versions of macroscopic base sets, both utilizing magnets for association but one controlling magnetic forces by shape complementarity (left) and another controlling forces by requiring patterns of magnetic materials, (B) closer views of shape-complementarity magnetic bases, and (C) single-stranded polymers composed of the latter bases.
Figure 5B:
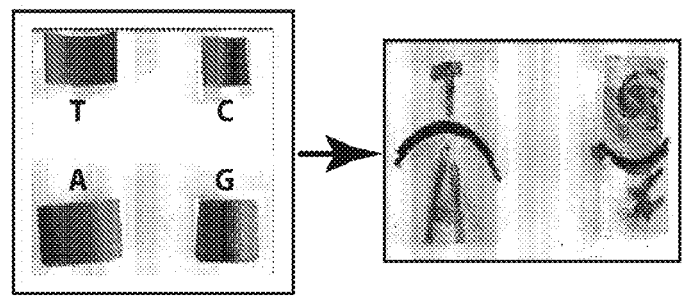
Figure 5C:
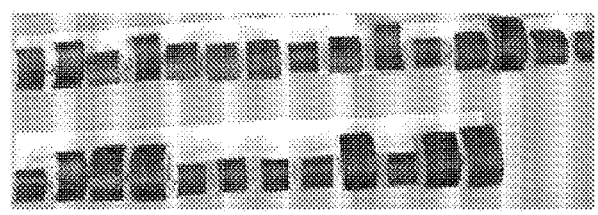

The building blocks ("monomers") for the single-stranded polymer are macroscopic particles that can specifically bind to another unique complementary building block. To achieve the specificity, magnetic dipole-dipole interaction (N/S pole), shape complementary, and/or mechanical stickiness (loop/hook in Velcro) can be utilized either independently or cooperatively. The material for the monomer may be but is not limited to plastic, polycarbonate, metal such as iron, and the like. FIG. 5A shows several examples for the design of centimeter-scale monomers. Several plastic or polycarbonate plates are shaped into complementary shapes, and modified with magnetic tapes onto their surface. In this example, depending on their shapes, the monomers are referred to as A, T, G, and C. In this system, monomer A binds specifically to monomer T (and vice versa), and monomer G binds specifically to monomer C (and vice versa) (FIG. 5B). The building blocks are further attached onto a tape or plastic surface to form the single-stranded polymers (FIG. 5C).

Note that while the naming convention of these macro-scale monomers is similar to that of DNA, the size scale as well as the material properties of these monomers are very different. Additionally, the set of different monomers that specifically pair to each other can easily be expanded.

The sequence of the monomers determines the binding specificity and target-structure information. Sequences can be designed by hand or by algorithmic software used for DNA nanotechnology.

Figure 6A:
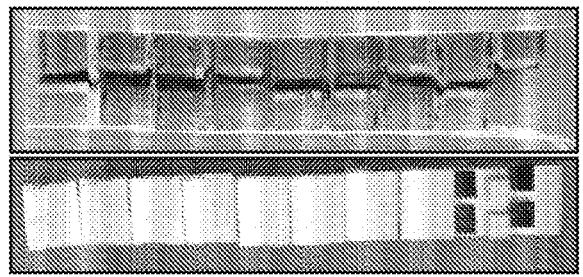
FIG. 6. Self-assembled structures from single-stranded macroscopic polymers, both (A) simple double stranded and (B) three-arm junctions.
Figure 6B:
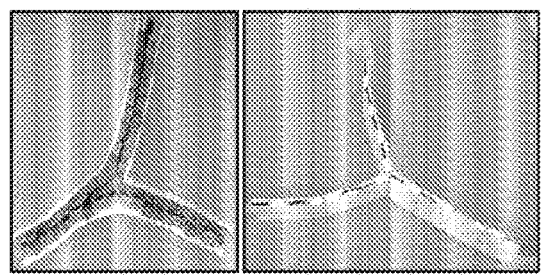
Figure 7A:
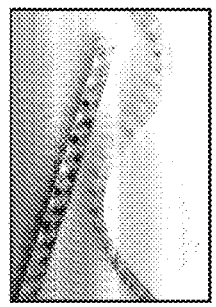
FIG. 7. A version of macroscopic polymers in which the spatial and polar patterns of magnets provide monomer specificity, and a polydimethylsiloxane (PDMS) polymer compound provides the backbone and monomer geometry and structure. One implementation is shown in (A), incorporating plastic pieces to hold the magnets in the proper position and orientation at each base during PDMS solidification. The polymer strand partially shown in (B) has a different, stiffer backbone (black) as well as small extensions of the PDMS that enforce anti-parallel polymerization with a complementary strand. Two polymer strands shown in (C) are partially complementary. Full complementarity on the right half causes complete hybridization and results in a relatively rigid polymer, while the un-hybridized, non-complementary segments on the left half display their relative flexibility. In (D) is shown a plastic mold used to form the polymers from liquid-phase PDMS.
Figure 7B:
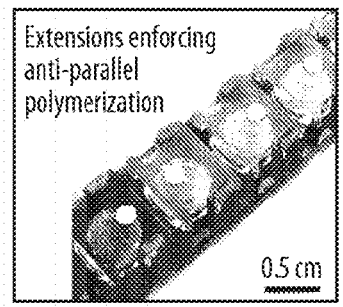
Figure 7C:
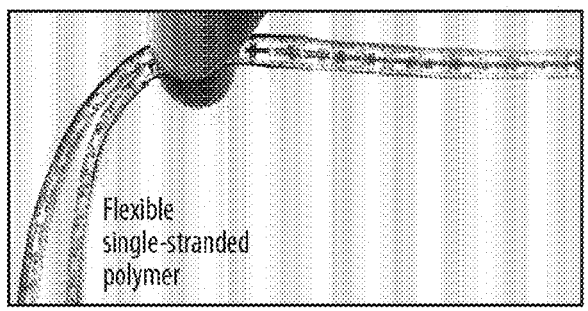
Figure 7D:
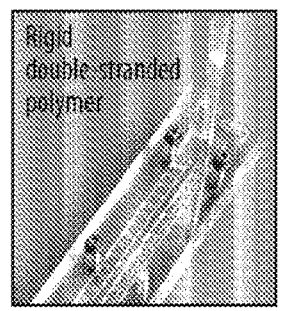

To assemble higher-order structures, the single-stranded polymers are placed in a reaction container, and shaken for several minutes either by machine or by hand. Shaking strength and frequency are important for assembling efficiency and kinetics. Self-assembly between the complementary regions of macropolymers occur spontaneous under these conditions. Different sequence design leads to distinct assembled structures, as shown in FIG. 6.

Figure 8A:
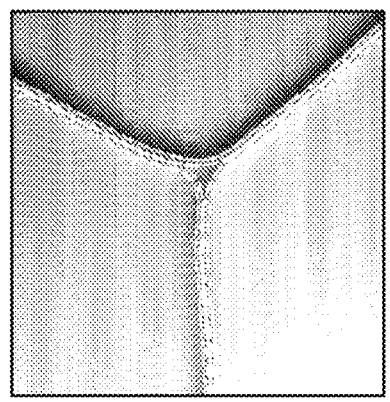
FIG. 8. Self-assembled structures from single stranded polymers of FIG. 7. (A) represents the top view of a three-arm junction, comprised of three separate PDMS and magnet-based macropolymer strands of 30 monomers each. All bases are matched with perfect complementarity and the structure represents the minimum potential energy state. An oblique view of the same structure is shown in (B). A single PDMS and magnet strand designed to fold back on itself into a "hairpin" shape is shown in (C).
Figure 8B:
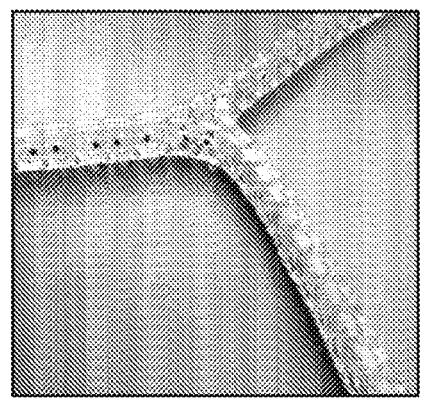
Figure 8C:
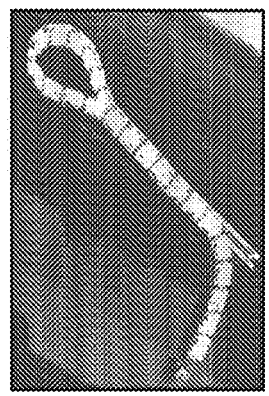
Figure 9A:
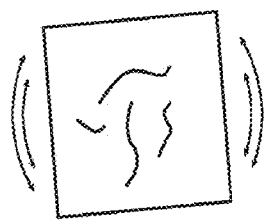
FIG. 9. Exemplary mechanisms for mixing and input of bond formation and disintegration energies at macro-scales. (A) Polymers may be mechanically agitated in air or other fluid, or (B) the fluid may be driven by pumps or jets, causing laminar or turbulent flow, or (C) fluid motion may be driven by movement of the walls of the container as with the counter-rotating discs common in turbulence research.
Figure 9B:
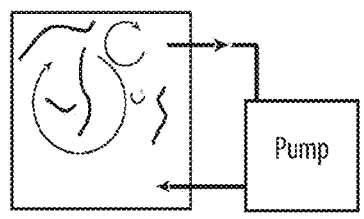
Figure 9C:
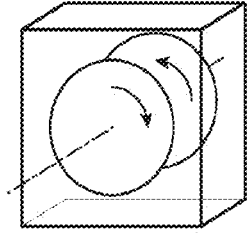

A third example is shown in FIG. 7. Polymers are composed of a polydimethylsiloxane (PDMS) backbone and monomers, cast in one piece in a mold in the manner of microfluidic devices. Magnets of different patterns, representing partially or fully complementary base pairs, are fixed within the polymer as the PDMS solidifies. Polymers are then mixed within a liquid (e.g., water) environment via fluid flow, leading to self-assembly. FIG. 8 shows a three-arm junction, composed of three separate 30-monomer polymers, formed in this manner, as well as a polymer in the shape of a hairpin and the same polymer after being "opened" by complementary polymer via the "toehold mediated strand displacement" mechanism known in DNA nanotechnology.

FIG. 8. shows examples of mixing apparatuses.

REFERENCES

1. Seeman, N. C. An Overview of Structural DNA Nanotechnology. *Mol Biotechnol* 37, 246-257 (2007).
2. Shih, W. M. & Lin, C. Knitting complex weaves with DNA origami. *Current Opinion in Structural Biology* 20, 276-282 (2010).
3. Zhang, D. Y. & Seelig, G. Dynamic DNA nanotechnology using strand-displacement reactions. *Nature Chem* 3, 103-113 (2011).
4. Douglas, S. M. et al. Self-assembly of DNA into nanoscale three-dimensional shapes. *Nature* 459, 414-418 (2009).
5. Andersen, E. S. et al. Self-assembly of a nanoscale DNA box with a controllable lid. *Nature* 459, 73-76 (2009).
6. Rothemund, P. W. K. Folding DNA to create nanoscale shapes and patterns. *Nature* 440, 297-302 (2006).
7. Seelig, G., Soloveichik, D., Zhang, D. Y. & Winfree, E. Enzyme-Free Nucleic Acid Logic Circuits. *Science* 314, 1585-1588 (2006).
8. Soloveichik, D., Seelig, G. & Winfree, E. DNA as a universal substrate for chemical kinetics. *Proceedings of the National Academy of Sciences* 107, 5393-5398 (2010).
9. Hariadi, R. F. & Yurke, B. Elongational-flow-induced scission of DNA nanotubes in laminar flow. *Phys. Rev. E* 82, 046307 (2010).
10. Yin, P. et al. Programming DNA Tube Circumferences. *Science* 321, 824-826 (2008).
11. Yin, P., Choi, H. M. T., Calvert, C. R. & Pierce, N. A. Programming biomolecular self-assembly pathways. *Nature* 451, 318-322 (2008).
12. SantaLucia, J. & Hicks, D. The thermodynamics of DNA structural motifs. *Annu. Rev. Biophys. Biomol. Struct.* 33, 415-440 (2004).
13. Zhang, D. Y. & Winfree, E. Control of DNA Strand Displacement Kinetics Using Toehold Exchange. *Journal of the American Chemical Society* 131, 17303-17314 (2009).
14. Phillips, A. & Cardelli, L. A programming language for composable DNA circuits. *Journal of The Royal Society Interface* 6, S419-S436 (2009).
15. Zadeh, J. N. et al. NUPACK: Analysis and design of nucleic acid systems. *J. Comput. Chem.* n/a-n/a (2010) .doi:10.1002/jcc.21596
16. Olson, A. J., Hu, Y. H. E. & Keinan, E. Chemical mimicry of viral capsid self-assembly. *Proceedings of the National Academy of Sciences* 104, 20731-20736 (2007).
17. Cho, J. et al. Nanoscale Origami for 3D Optics. *Small* doi:10.1002/smll.201100568
18. Du, Y., Lo, E., Ali, S. & Khademhosseini, A. Directed assembly of cell-laden microgels for fabrication of 3D tissue constructs. *Proceedings of the National Academy of Sciences* 105, 9522 (2008).
19. Davey, R. J., Williams-Seton, L., Lieberman, H. F. & Blagden, N. Stabilizing a solid-solid interface with a molecular-scale adhesive. *Nature* 402, 797-799 (1999).
20. Ramsay, G. DNA chips: State-of-the art. *Nat Biotech* 16, 40-44 (1998).
21. Smith, S., et al., Overstretching B-DNA: the elastic response of individual double stranded and single stranded DNA molecules. *Science* 271, 795-799 (1996).

U.S. Pat. No. 5,355,577
U.S. Pat. No. 6,507,989 B1
U.S. Pat. No. 7,007,370 B2

EQUIVALENTS

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A synthetic, non-nucleic acid structure comprising:
a first heterogeneous plurality of non-nucleic acid monomers attached in a pre-determined manner to a first non-nucleic acid polymeric backbone; and
a second heterogeneous plurality of non-nucleic acid monomers attached in a pre-determined manner to a second non-nucleic acid polymeric backbone, wherein monomers of the first plurality have complementary shapes, mirror image magnetic configurations, and opposite N/S polarity relative to monomers of the second plurality, and wherein monomers of the first plurality are bound to monomers of the second plurality through magnetic attraction and shape complementarity.

2. The structure of claim 1, wherein the structure is linear.

3. The structure of claim 1, wherein the structure is branched.

4. The structure of claim 1, wherein the first non-nucleic acid polymeric and the second non-nucleic acid polymeric backbone are comprised of plastic, metal or semiconductor material.

5. The structure of claim 1, wherein the structure comprises 2 to 100 different monomers.

6. The polymer of claim 1, wherein monomers in the first and second pluralities are comprised of plastic, hydrogel, metal, semiconductor material or a combination thereof.

7. The structure of claim 1, wherein monomers in the first and second pluralities range from 10 nanometers to 10 meters.

8. The structure of claim 1, wherein monomers in the first and second pluralities are attached to the first backbone and second backbone, respectively, by an adhesive, a molten material, a mechanical fitting, a molecular interaction or a combination thereof.

9. The structure of claim 1, wherein monomers in the first and second pluralities further comprise an attachment moiety.

10. A composition comprising one or more structures of claim 1.

11. A synthetic, non-nucleic acid structure comprising:
a first heterogeneous plurality of monomers attached in a pre-determined manner to a first backbone comprised of plastic, metal or semiconductor material; and
a second heterogeneous plurality of monomers attached in a pre-determined manner to a second backbone comprised of plastic, metal or semiconductor material,
wherein monomers of the first plurality have complementary shapes, mirror image magnetic configurations, and opposite N/S polarity relative to monomers of the second plurality,
wherein monomers of the first plurality are bound to monomers of the second plurality through magnetic attraction and shape complementarity, and
wherein the monomers in the first and second heterogeneous pluralities are comprised of plastic, hydrogel, metal, semiconductor material or a combination thereof.

12. The structure of claim 11, wherein the monomers in the first and second heterogeneous pluralities are attached to the backbone by an adhesive or mechanical fitting.

13. A synthetic, non-nucleic acid structure comprising:
a first heterogeneous plurality of plastic monomers attached in a pre-determined manner to a first plastic backbone; and
a second heterogeneous plurality of plastic monomers attached in a pre-determined manner to a second plastic backbone,
wherein monomers of the first plurality have complementary shapes, mirror image magnetic configurations, and opposite N/S polarity relative to monomers of the second plurality, and
wherein monomers of the first plurality are complementary to and bound to monomers of the second plurality through magnetic attraction and shape complementarity.

14. The structure of claim 11, wherein the structure is linear.

15. The structure of claim 11, wherein the structure is branched.

16. The structure of claim 11, wherein the structure comprises from 2 to 100 different monomers.

17. The structure of claim 13, wherein the monomers in the first and second heterogeneous pluralities are attached to the first backbone and the second backbone, respectively, by an adhesive or mechanical fitting.

18. The structure of claim 13, wherein the structure is linear.

19. The structure of claim 13, wherein the structure is branched.

20. The structure of claim 13, wherein the structure comprises 2 to 100 different monomers.

* * * * *

UNITED STATES PATENT AND TRADEMARK OFFICE
CERTIFICATE OF CORRECTION

PATENT NO. : 9,617,392 B2  
APPLICATION NO. : 14/131701  
DATED : April 11, 2017  
INVENTOR(S) : Thomas E. Schaus et al.

Page 1 of 1

It is certified that error appears in the above-identified patent and that said Letters Patent is hereby corrected as shown below:

In the Specification

Please insert the following paragraph at Column 1, Line 18:
--GOVERNMENT LICENSE RIGHTS
This invention was made with government support under 1434560 awarded by National Science Foundation. The government has certain rights in the invention.--

Signed and Sealed this
Fifth Day of May, 2020

Andrei Iancu
*Director of the United States Patent and Trademark Office*